United States Patent
Price et al.

(10) Patent No.: US 10,679,189 B1
(45) Date of Patent: Jun. 9, 2020

(54) SYSTEM AND METHOD FOR MONITORING RETIREMENT CONDUCT

(71) Applicant: Wells Fargo Bank, N.A., San Francisco, CA (US)

(72) Inventors: James E. Price, Bluffton, SC (US); James R. Seeley, Charlotte, NC (US); Ami Warren Lyman, Matthews, NC (US); Jack W. Zaney, Huntersville, NC (US); Joy Sebrina Berry, Charlotte, NC (US); Claes Dahlstrand, Charlotte, NC (US); Ralph H. Groce, III, Stroudsburg, PA (US); Kanwaljit Khurana, Huntersville, NC (US); Robert Charles Wilson, Jr., Matthews, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 496 days.

(21) Appl. No.: 15/394,626

(22) Filed: Dec. 29, 2016

(51) Int. Cl.
  *G06Q 40/00* (2012.01)
  *G06Q 10/10* (2012.01)
  *G06Q 40/06* (2012.01)

(52) U.S. Cl.
  CPC ......... *G06Q 10/1057* (2013.01); *G06Q 40/06* (2013.01)

(58) Field of Classification Search
  USPC .......... 705/35, 39, 38, 40, 7.33, 14, 26, 400; 709/219; 707/603
  See application file for complete search history.

(56) References Cited

U.S. PATENT DOCUMENTS

| | | | |
|---|---|---|---|
| 5,787,404 A | 7/1998 | Fernandez-Holmann et al. | |
| 6,078,891 A * | 6/2000 | Riordan | G06Q 20/20 705/16 |
| 6,164,533 A | 12/2000 | Barton | |
| 7,516,883 B2 | 4/2009 | Hardesty et al. | |
| 7,784,682 B2 | 8/2010 | Taylor et al. | |
| 7,908,170 B2 | 3/2011 | Asmar et al. | |
| 7,937,286 B2 * | 5/2011 | Newman | G06Q 30/02 705/7.31 |
| 7,954,698 B1 * | 6/2011 | Pliha | G06Q 40/02 235/379 |
| 7,996,291 B2 * | 8/2011 | Baiye | G06Q 40/00 705/35 |

(Continued)

OTHER PUBLICATIONS

Margo Georgiadis, Katrina lane, and Sue Whalle, Smart Data, Smart Decision, Smart Profit, McKinsey & Company. (Year: 2000).*

*Primary Examiner* — Tien C Nguyen
(74) *Attorney, Agent, or Firm* — Schwegman Lundberg & Woessner, P.A.

(57) ABSTRACT

A system includes at least one hardware processor and a memory storing instructions that, when executed by the at least one hardware processor, cause the at least one hardware processor to perform operations including identifying a component of tracked conduct, the component of tracked conduct including a first conduct trigger condition and a reward, the first conduct trigger condition is associated with conduct of a user related to retirement, receiving conduct data associated with the first conduct trigger condition from a first data source, determining, using the conduct data, that the first conduct trigger condition is satisfied, and causing the reward to be provided to the user.

20 Claims, 6 Drawing Sheets

(56) References Cited

U.S. PATENT DOCUMENTS

| | | |
|---|---|---|
| 8,245,909 B2 | 8/2012 | Pletz et al. |
| 8,260,699 B2 | 9/2012 | Smith |
| 2002/0026348 A1* | 2/2002 | Fowler ............... G06Q 30/02 |
| | | 705/14.11 |
| 2003/0061093 A1 | 3/2003 | Todd |
| 2007/0011089 A1 | 1/2007 | Deschryver |
| 2007/0106581 A1 | 5/2007 | Mitchell et al. |
| 2007/0112655 A1 | 5/2007 | Jones et al. |
| 2007/0192219 A1 | 8/2007 | White et al. |
| 2007/0294166 A1 | 12/2007 | Cello |
| 2008/0262920 A1 | 10/2008 | O'Neill et al. |
| 2009/0276293 A1* | 11/2009 | Zellner ............. G06Q 10/087 |
| | | 705/14.4 |
| 2010/0010888 A1 | 1/2010 | Maertz |
| 2010/0010905 A1* | 1/2010 | Arzumanyan ..... G06Q 20/0453 |
| | | 705/21 |
| 2010/0250355 A1 | 9/2010 | McInnes et al. |
| 2010/0274650 A1 | 10/2010 | Kantor et al. |
| 2010/0280881 A1* | 11/2010 | Faith ............. G06Q 10/06375 |
| | | 705/7.34 |
| 2011/0035280 A1* | 2/2011 | Fordyce, III ........... G06Q 20/10 |
| | | 705/14.53 |
| 2011/0087547 A1* | 4/2011 | Amaro ................ G06O 30/02 |
| | | 705/14.53 |
| 2011/0093335 A1* | 4/2011 | Fordyce, III ........... G06Q 20/40 |
| | | 705/14.53 |
| 2011/0106601 A1* | 5/2011 | Perlman ............. G06Q 30/0212 |
| | | 705/14.14 |
| 2013/0013478 A1 | 1/2013 | Broadbent |
| 2015/0058109 A1 | 2/2015 | Lange |
| 2015/0081411 A1 | 3/2015 | Tucker et al. |

\* cited by examiner

SYSTEM AND METHOD FOR MONITORING RETIREMENT CONDUCT

TECHNICAL FIELD

Embodiments described herein generally relate to monitoring systems and, for example and without limitation, to software systems and methods for monitoring and shaping conduct related to retirement.

BACKGROUND

Retirement planning is a discipline of personal financial planning focused on financial stability during later years of a person or couple's lives. The "golden years" of life generally represent a time when the retirees will have limited income, usually relying at least partially on savings or investments made during their working lives, or interest or dividend income from those assets. To properly prepare for retirement, people often save or invest portions of their income through years or decades of their working career. However, many people do not properly prepare for retirement. Whether through ignorance of retirement planning disciplines, lack of foresight, or a perceived inability to save, people often conduct themselves in ways that are not beneficial to their retirement disposition. For example, people may neglect their own health or social wellbeing, or may neglect or undermine their retirement plan with their actions.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

The systems and methods described herein, for example, describe a technical solution for monitoring and shaping conduct of users as it relates to retirement planning and execution. In some example embodiment, the system monitors conduct of a current or prospective retiree (the "user") and attempts to shape that conduct by providing rewards for encouraged conduct, that conduct which is beneficial to the retirement position of the user.

A conduct monitoring system is described herein that allows various conduct of the user potentially affecting retirement to be monitored. In an example embodiment, the conduct monitoring system shapes conduct of the user by incentivizing certain types of conduct such as, for example, reviewing their retirement portfolio or plan, increasing their 401k withdrawal percentage, exercising regularly, eating wisely, staying socially active, or spending wisely. The conduct monitoring system may monitor these various types of conduct using, for example, geolocation data of the user provided by their smartphone, biometric data of the user provided by a wearable device, transactional or investment data provided by their financial institutions, or social media data from a social network. In some embodiments, the conduct monitoring system may initiate capture of conduct data based on conduct data, such as based on geolocation of the user, or based on a transaction of the user.

With these and other data sources, the conduct monitoring system analyzes the conduct of the user against a profile of encouraged or discouraged retirement conduct. The user may be incentivized for encouraged conduct by rewards such as, for example, deposits of cash or other assets into their retirement accounts, points that may be used to further retirement goals (e.g., via preferred providers), educational products or services that promote retirement goals, or preferred services. These incentives may be provided by third parties having some nexus with the user or the user's retirement such as, for example, employers, insurance companies, fund managers, or preferred suppliers. As such, the user's conduct may be tracked and incentivized to promote conduct that is both beneficial for the user themselves (e.g., in light of their own retirement) as well as for the reward backer.

Figure 1:
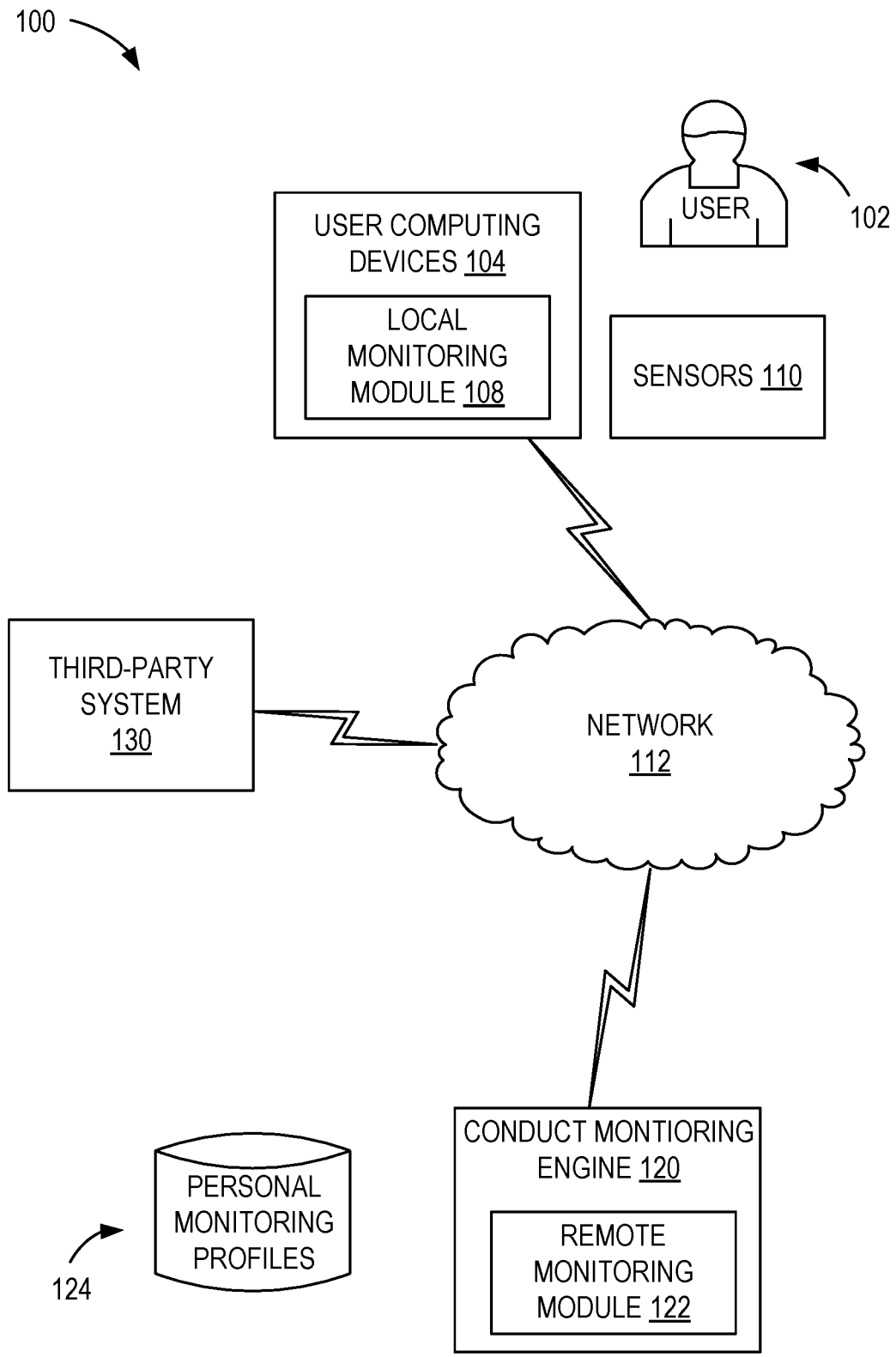
FIG. 1 illustrates an example networked environment including components of a conduct monitoring system for monitoring conduct of a user.

FIG. 1 illustrates an example networked environment including components of a conduct monitoring system 100 for monitoring conduct of a user 102. In an example embodiment, the notification system 100 includes a conduct monitoring engine 120 communicatively coupled to one or more user computing devices 104 (e.g., a smartphone, a laptop or desktop personal computer, a tablet device, a smart TV, wearable computing devices, and so forth) of the user 102 via a network 112 (e.g., a cellular network, the Internet, and so forth).

In an example embodiment, the computing devices 104 may include a local monitoring module 108, and may include one or more sensors 110. Sensors 110 may include a global positioning system (GPS) receiver configured to determine a location of the user 102, or health/fitness sensors such as biometric sensors (e.g., tracking heart rate, number of steps, blood pressure, level of exercise, and so forth). Sensor data from sensors 110 may be used to monitor certain aspects of conduct of the user 102, as described in further detail below.

In an example embodiment, the conduct monitoring engine 120 includes a remote notification module 122 configured to operate in conjunction with the local monitoring modules 108 of the user computing devices 104 to perform conduct monitoring functionality as described herein. The conduct monitoring engine 120 is executed by a computing device remote from the user computing devices 104 (e.g., a server system, not separately depicted). In some embodiments, the conduct monitoring engine 120 may be executed by one or more of the user computing devices 104. The conduct monitoring engine 120 also includes personal monitoring profiles 124. The personal monitoring profiles 124 are stored in a database (not separately shown), such as a configuration file or a relational database. The personal monitoring profiles 124 store configuration information associated with conduct monitoring of the user 102. The personal monitoring profile 124 data may be stored on the user computing devices 104, or remote from the user computing devices 104 (e.g., on a remote server device).

In some embodiments, the conduct monitoring engine 120 and the user computing devices 104 may also be communicatively coupled to one or more third-party systems 130. The third-party systems 130 may include, for example, financial institutions associated with the user 102 (e.g., banking institutions hosting banking accounts of the user 102, investment services firms hosting investment or retirement accounts of the user 102, payment card providers providing payment card services to the user 102), health monitoring providers associated with the user 102 (e.g., providers of wearable devices that capture biometric data from sensors 110, such as FitBit®), and social network providers associated with the user 102 (e.g., Facebook®, LinkedIn®, and so forth).

During operation, the conduct monitoring engine 120 monitors aspects of conduct of the user 102 associated with retirement or retirement planning, as defined by the personal monitoring profile 124 of the user 102. Some aspects of conduct may cause the conduct monitoring engine 120 to capture sensor data from the sensors 110 of the user computing devices 104 (e.g., biometric or geolocation data), or application data from the user computing devices 104 (e.g., transaction data, social network data, communications data), or third-party data from the third-party systems 130 (e.g., transaction data, social network data, financial data). In some embodiments, certain conduct data may cause the collection of other conduct data. For example, detecting that the user 102 is at a particular location (e.g., determining that the user 102 is at a Starbucks® location, using geolocation data) may cause the conduct monitoring engine 120 to collect transaction data (e.g., historical transaction data of the user 102 at Starbucks®, or proximate the time of that the user 102 is at the location). The conduct monitoring engine 120 monitors conduct of the user 102 on an ongoing or regular basis and provides incentives (e.g., rewards) to the user 102 for encouraged conduct, as described in further detail below.

Figure 2:
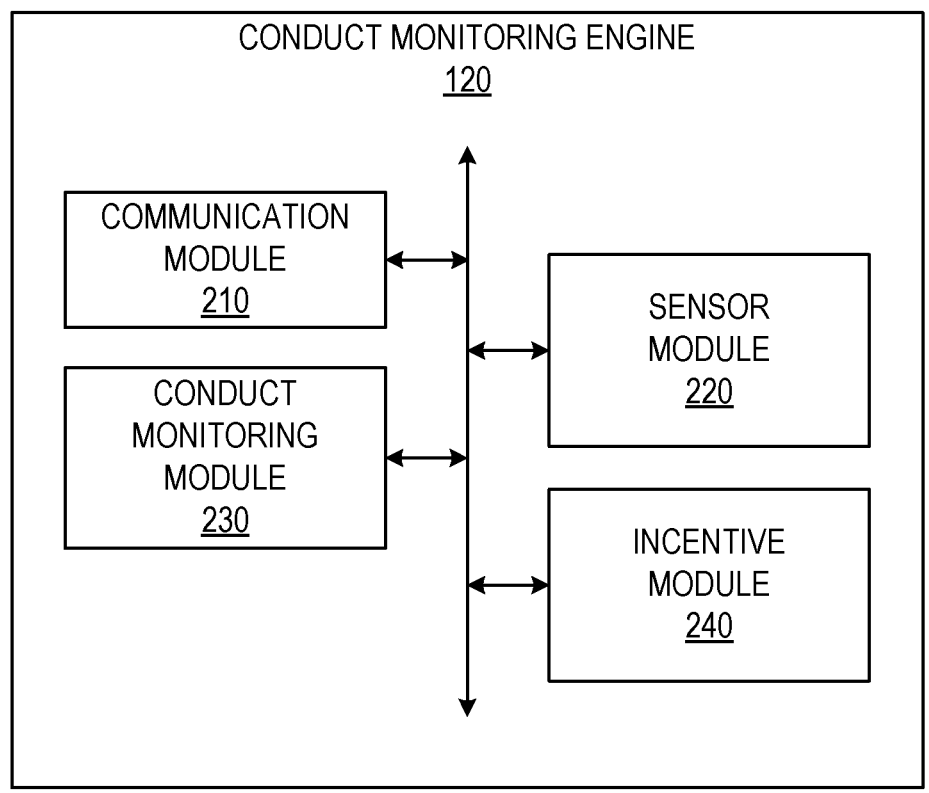
FIG. 2 is a block diagram showing components within the conduct monitoring engine, according to some embodiments.

FIG. 2 is a block diagram showing components within the conduct monitoring engine 120, according to some embodiments. The conduct monitoring engine 120 may be hosted on dedicated or shared server machines (not shown) that are communicatively coupled to facilitate communications between the server machines. The components themselves may be communicatively coupled to each other and to various data sources, so as to allow information to be passed among the components or so as to allow the components to share and access common data. Furthermore, the components may access one or more databases (e.g., personal monitoring profiles 124) via database servers (not separately shown). In the example embodiment, the conduct monitoring engine 120 includes a communication module 210, a sensor module 220, a conduct monitoring module 230, and an incentive module 240, each of which is a component of the remote notification module 122 shown in FIG. 1. In some embodiments, the local notification module 108 may include one or more of the modules 210, 220, 230, and 240.

In an example embodiment, conduct monitoring by the conduct monitoring engine 120 includes one or more components of tracked conduct (not depicted in FIG. 2). Each component of tracked conduct includes one or more conduct trigger conditions and a reward (e.g., an incentive) to apply when the conduct trigger condition is satisfied. In other words, the conduct trigger conditions may be used to evaluate the conduct of the user 102 (e.g., for compliance or achievement of encouraged conduct) and, when the conduct of the user 102 has satisfied the conduct trigger conditions, the conduct monitoring engine 120 provides the reward or otherwise causes the reward to be provided. Trigger conduct conditions may identify a conduct data source such as the sensors 110, or third-party data from third-party systems 130. Further, the reward provided by the tracked conduct may be provided by the conduct monitoring engine 120, or by one or more of the third-party systems 130.

The communication module 210, in an example embodiment, provides network communication functionality between the conduct monitoring engine 120 and other computing devices, such as the user computing device 104 and the third-party systems 130. In some embodiments, the communication module 210 facilitates communication over the Internet (e.g., the network 112) or other Internet Protocol (IP) based networks (e.g., IEEE 802 standards). In some embodiments, the communication module 210 facilitates communication to devices over cellular networks (e.g., to smartphone or tablet devices over a 3G/4G network). In other embodiments, the communication module 210 allows the conduct monitoring engine 120 to communicate over both IEEE 802 standard-based network and a cellular network at the same time (e.g., connects to the inquiring user computing device 104 over the cellular network and connects to third-party websites over the 802 network). The communication module 210 may, for example, receive certain conduct data associated with the user 102 from the third-party systems 130.

In an example embodiment, the sensor module 220 provides functionality associated with collection and analysis of sensor data from the sensors 110. The sensor data may come from a variety of types of sensors, such as GPS receiver data (e.g., providing location data associated with the user computing devices 104) and biometric data (e.g., health and fitness data of the user 102). The sensor module 220 may receive raw data values from the sensors 110, and may analyze these values in conjunction with particular types of conduct monitoring related to retirement. This sensor data may be used as a part of the trigger conditions for evaluating the conduct of the user 102 against monitoring profiles 124.

The conduct monitoring module 230 evaluates the conduct of the user 102. More specifically, in an example embodiment, the conduct monitoring module 230 reads a monitoring profile 124 for the user 102, collects conduct data identified by the conduct trigger conditions, and evaluates the conduct data of the user 102 against those conduct trigger conditions. For example, in an effort to reduce unnecessary spending or live a healthier lifestyle, the user 102 may have a component of tracked conduct associated with their spending or eating habits that evaluates how often they visit their favorite coffee house or fast-food restaurant. As such, the conduct trigger conditions may allow for no more than three visits per week to the coffee house, or one visit per month to the fast-food restaurant. To evaluate this type of conduct, these conduct trigger conditions may utilize transaction data of the user 102 (e.g., from their payment cards), or geolocation data of the user 102 (e.g., from GPS sensor 110 on their smartphone), as the data sources for the conduct trigger conditions. The conduct monitoring module 230 evaluates the conduct data of the user 102 against the conduct trigger conditions to determine that, for example, the user 102 visited the coffee house five times last week (and is thus not entitled for the reward), or that the user 102 only ate at the fast-food restaurant once last month (and is therefore entitled to the reward).

Based on the conduct evaluation done by the conduct monitoring module 230, the incentive module 240 provides the reward to, or causes the reward to be provided to, the user 102. Continuing the above example, upon determining that the user 102 avoided eating at the fast-food restaurant more than once in the last month, the incentive module 240 may offer a preferred service to the user 102, or may transmit a reward confirmation message to the third-party system 130 causing the third party (e.g., a life insurance provider or health insurance provider) to initiate a funds deposit into a retirement account of the user 102.

In an example embodiment, the conduct monitored, and the reward provided, by the conduct monitoring engine 120 are related to retirement of the user 102. Such conduct may be tailored to and evaluated while in pre-retirement (e.g., while still employed by their primary employer), or while in retirement (e.g., after retiring from their primary employer). Since physical health has a significant impact on retirement (e.g., longevity, health care expenses, and so forth), retirement-related conduct may include health and fitness related conduct (e.g., how often the user 102 exercises, eating habits of the user 102, blood pressure of the user 102). Since mental health has a significant impact on retirement (e.g., longevity, physical health), retirement-related conduct may include mental health related conduct (e.g., the level of social activity of the user 102, ongoing education of the user 102, amount of reading and hobbies engaged in by the user 102). Since financial health has a significant impact on retirement (e.g., solvency of retirement savings compared to longevity projections), retirement-related conduct may include financial conduct (e.g., level and performance of retirement savings and investments, contribution to retirement portfolio, retirement planning, spending habits pre- and post-retirement, current and future earning potential). These and various other example retirement-related conduct and rewards are described below.

Figure 3:
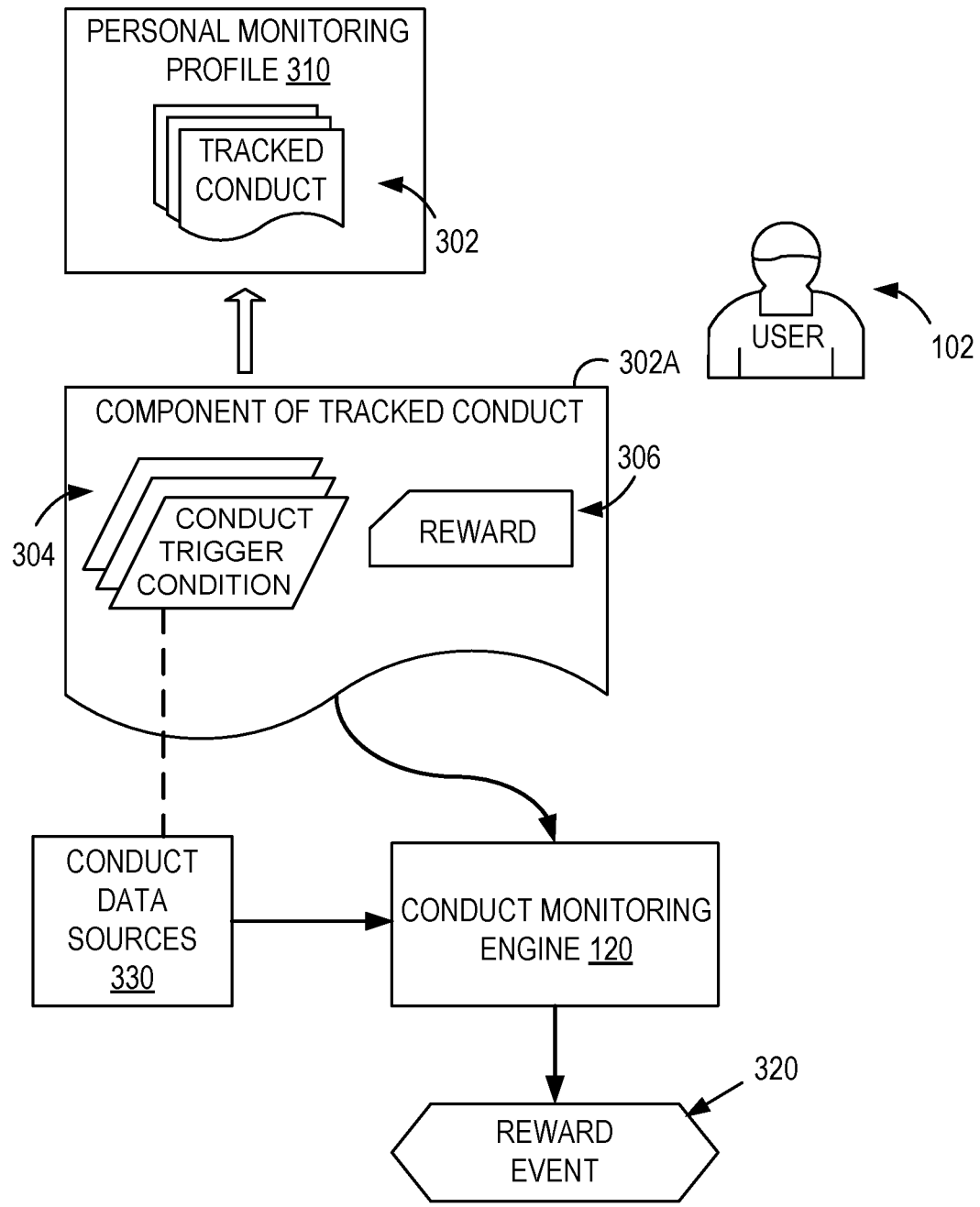
FIG. 3 is a workflow diagram of a component of tracked conduct used by the conduct monitoring engine to evaluate retirement conduct of the user within the conduct monitoring system.

FIG. 3 is a workflow diagram of a component of tracked conduct 302A used by the conduct monitoring engine 120 to evaluate retirement conduct of the user 102 within the conduct monitoring system 100. In an example embodiment, a personal monitoring profile 310 is identified for the user 102. The personal monitoring profile 310 may be similar to the personal monitoring profiles 124. The personal monitoring profile 310 includes one or more components of tracked conduct 302. Each component of tracked conduct 302 is configured to evaluate conduct of the user 102 related to some aspect of retirement. More specifically, an example component of tracked conduct 302A includes one or more conduct trigger conditions 304 and a reward 306. The conduct trigger conditions 304 represent a logical definition of the conditions that cause the reward 306 to be provided to the user 102. The conduct trigger conditions 304 may reference one or more conduct data sources 330, such as the third-party systems 130 or the sensors 110, to evaluate aspects of conduct of the user 102. In the example embodiment, each component of tracked conduct 302 relates to retirement associated with the user 102.

In some embodiments, the personal monitoring profile 310 of the user 102 may be configured by the user 102 (e.g., via a graphical user interface (GUI)). In other words, the user 102 may define one or more of the components of tracked conduct 302 for which they have their conduct evaluated. As such, the user 102 may use the conduct monitoring system 100 to police their own conduct. For example, the user 102 may wish to monitor their own conduct with regard to fitness. The conduct monitoring engine 120 may provide a set of prospective components of tracked conduct 302 related to fitness, and may identify one or more third parties interested in providing rewards 306 for such fitness conduct of the user 102 (e.g., a health care provider, employer, or life insurance provider of the user 102). The conduct monitoring engine 120 may, for example, identify that the user 102 historically exercises only twice per week for an average of 30 minutes. To improve on health, the conduct monitoring engine 120 may create a prospective component of tracked conduct 302A with a trigger condition 304 of weekly exercise of three times per week for an average of 45 minutes, and may pair a particular reward 306 offered by the third party with that component of tracked conduct 302A. As such, the user 102 may elect to pursue that reward by activating that component of tracked conduct 302 within their personal monitoring profile 310.

In the example embodiment, the personal monitoring profile 310 includes one or more components of tracked conduct 302 configured automatically by the conduct monitoring system 100, or by one or more third parties (e.g., those parties providing the rewards 306). For example, the conduct monitoring engine 120 may automatically evaluate the historical exercise pattern of the user 102 (e.g., twice weekly for an average of 30 minutes), determine an improved target exercise level (e.g., three times weekly for an average of 45 minutes), determine the reward 306 for such conduct (e.g., by providing the reward 306 from potential rewards internally available, or by pairing a third party reward provider with the component of tracked conduct 302A), and automatically activating the component of tracked conduct 302A in the personal monitoring profile 310 of the user 102.

In addition to exercise tracking, as in the above example, other examples of historical conduct of the user 102 that may be used to automatically generate conduct trigger conditions 304 may include occurrences or frequency of occurrences of visits to healthcare or financial service providers (e.g., how long it has been since the user 102 last undergone a physical, or last met with their retirement planning advisor). Such conduct data may be provided by the third party system 130 (e.g., of the healthcare provider, health insurance company, or investment services firm), or may be self-reported.

Another example may include spending-related tracking. For example, the conduct monitoring engine 120 may automatically evaluate the historical spending habits of the user 102 on various types of goods or services, such as entertainment, dining, utilities, housing, travel, transportation, or even specific goods or services such as, for example, coffee, cigarettes, beer, cable television, Internet access, or auto expenses. Such conduct data may be provided by, for example, transaction data from payment card providers, or bank account data provided by banking institutions, or other third parties such as utility companies or merchants.

Automatic generation of thresholds related to historical spending habits may leverage a retirement plan of the user 102. For example, the user 102 may have a retirement plan that defines a threshold for how much can be spent on various types of activities or services to comply with the plan. As such, the plan thresholds may be leveraged as thresholds with which to build conduct trigger conditions 304 for tracking the ongoing conduct of the user 102.

In some embodiments, third parties may define the conduct trigger conditions 304 or the rewards 306 for the components of tracked conduct 302, and may be based an identified association between the user 102 and the third party. For example, the conduct monitoring system 100 may identify an association between the user 102 and a particular third party (not separately depicted) (e.g., a financial institution managing the retirement portfolio of the user 102). The third party may wish to provide an incentive for their clients, including the user 102, for regularly revisiting their retirement plan, or for increasing their 401k withdrawal. In other words, the conduct trigger condition 304 may be logging into their retirement account within a certain time period (e.g., within one month after receiving a reminder notification), or increasing their 401k withdrawal percentage with their employer. As such, the third party may provide a reward 306, for example, as a deposit into a retirement savings account of a fixed amount of funds for compliance with the encouraged conduct. Accordingly, in this example, both the conduct and the reward are retirement-related, building a better retirement prospect for the user 102 by both shaping their conduct to better their retirement plan and by improving their retirement situation with the given reward.

Conduct related to retirement and monitored by the conduct monitoring system 100 (e.g., through conduct trigger conditions 304) may be categorized broadly into health-related conduct and financial-related conduct. Health-related conduct has a nexus with retirement in that the health and wellbeing of the user 102 may impact how long they live (e.g., prospective lifespan), or how healthy they are in their later years (e.g., reliance on healthcare, increased healthcare costs). Financial-related conduct has a nexus with retirement in that the finances of the user 102 may impact how much the user 102 has to spend during retirement, their projected lifestyle during retirement, or the length they can sustain their desired lifestyle during retirement. Each of these types of conduct may include more specifically focused sub-types of conduct. Further, each of these types of conduct of the user 102 may be monitored by various means (e.g., different conduct data sources 330).

Health-type conduct may include fitness conduct, lifestyle conduct, consumption conduct, wellness conduct, social conduct, and mental conduct. Fitness conduct may include, for example, regularity of exercise, level of exercise, duration of exercise, type of exercise, or biometric levels. Such conduct may be measured by, for example, wearable sensors such as FitBit® (e.g., leveraging blood pressure, heart rate, movement patterns, and so forth), or geolocation during exercise (e.g., number of visits, time spent at the local gym), or self-reporting (e.g., exercise times entered by the user 102).

Lifestyle conduct may include, for example, how often the user 102 vacations, or engages in dangerous activities. Such conduct may be measured by, for example, geolocation data (e.g., amount of time spent away from a home region of the user 102), or via transaction data (e.g., number of transactions performed at a location away from the home region of the user 102).

Consumption conduct may include, for example, alcohol, tobacco and recreational drug use, or eating patterns. Such conduct may be measured by, for example, transaction data (e.g., how many packs of cigarettes the user 102 purchased with their payment card), geolocation data (e.g., how many times the user 102 visits a bar), or social media data (e.g., how often the user 102 references drug use on Facebook®).

Social conduct may include, for example, regularity of social activity, types of social activities engaged in, proximity to others engaged in social activity. Such conduct may be measured by, for example, transaction data (e.g., how often the user 102 pays for golf greens fees), geolocation data (e.g., how often the user 102 is proximate their friends or other retirees), or social media data (e.g., how often the user 102 interacts with or plans events with others on Facebook®).

Mental conduct may include, for example, regularity of performing a favorite hobby, regularity or amount of time spent reading, or time spent attending educational classes. Such conduct may be measured by, for example, transaction data (e.g., how often the user 102 pays for bowling), device data (e.g., how often the user 102 spends actively reading a digital book through their e-reader device), or geolocation data (e.g., how often the user 102 is at an educational institution).

Finance-type conduct may include spending conduct, retirement savings conduct, retirement education and planning conduct, and investment conduct. Spending conduct may include, for example, how much the user 102 spends on discretionary expenses, housing expenses, utility expenses, travel, dining, and entertainment. Such conduct may be measured by, for example, transaction data (e.g., payment card transactions at dining vendors, mortgage payments made to a mortgage lender, checks written from a checking account of the user 102 to a local utility service), or geolocation (e.g., how often the user 102 visits dining or entertainment locations, or how often the user 102 travels away from their home region).

Retirement savings conduct may include, for example, regularity of review of retirement plan or retirement portfolio, establishing a retirement plan or portfolio, adjusting a level of contribution to a retirement asset (e.g., 401k, savings account), or executing trades within a retirement portfolio. Retirement education and planning conduct may include, for example, participating in retirement education classes, or visiting with a retirement planning associate. Such conduct may be measured by, for example, third-party account data (e.g., login data or transaction data from a user account of the user 102 at their retirement services institution, meeting information between the user 102 and associates, class registration information for the user 102), or employer data (e.g., 401k contribution amount as provided by the employer or associated 401k manager, or as indicated on a paystub of the user 102). For example, the user 102 may change their 401k deposit rate from 2% to 3% of their salary, which may be determined from employee payment profile information of the user 102 from their employer.

Investment conduct may include, for example, regularity of review of investment performance, performance of retirement portfolio (e.g., as a proxy for direct action of the user 102 based on selecting better-performing assets), changes in earnings levels, and changes in investment assets (e.g., withdrawals or deposits into investment accounts). Such conduct may be measured by, for example, third-party account data (e.g., login data from the user account of the user 102 at their investment services institution), market data and portfolio data (e.g., portfolio value based on current market values of the portfolio assets), employer or transaction data (e.g., levels of, or changes in, compensation as an employee, from the employer or from banking account deposit data), or transaction data (e.g., withdrawals or deposits into financial accounts).

Incentives provided by the conduct monitoring system 100, in an example embodiment, also have a nexus with retirement, thereby advancing the retirement prospects of the user 102. Retirement-related rewards may include, for example, providing an asset deposit (e.g., cash, securities) to the user 102, such as into a retirement account or a savings account. Retirement-related rewards may include, for example, providing preferred services to the user 102 related to retirement, such as services from a preferred financial advisor, or access to preferred investment or retirement planning software tools. Retirement-related rewards may include, for example, providing healthcare-related, health insurance-related, life-insurance-related, or fitness-related services, funds, or discounts to the user 102, such as free diagnostic screenings, or discounts to a life- or health-insurance plan or to a gym membership. Retirement-related rewards may include providing retirement-related products or educational services to the user 102 such as retirement planning books or educational classes related to retirement planning or investment. Retirement-related rewards may include, for example, providing reward points to a reward account of the user 102 that may be spent by the user to purchase retirement-related products or services, such as any of the retirement-related rewards mentioned herein.

In some embodiments, the component of tracked conduct 302 may identify certain aspects of conduct data that cause other aspects of conduct data to be captured or collected. For example, presume the component of tracked conduct 302A is associated with a monthly spending threshold for dining (e.g., eating out). The component of tracked conduct 302A may cause the conduct monitoring system 100 (e.g., through the conduct monitoring engine 120 or the local monitoring module 108) to determine when the user 102 is at a dining location (e.g., via GPS data from the sensors 110 and geofencing of the dining location). Upon detection that the user 102 is at a dining location, such detection may cause the conduct monitoring system 100 to collect the current month's dining transaction data of the user 102 (e.g., from a payment card provider, or a banking institution). The conduct monitoring system 100 may alert the user 102 of their current dining total (e.g., regardless of their current dining total, or if the user 102 is determined to be nearing a dining threshold identified in the conduct trigger condition 304). As such, the user 102 may alter their conduct, or be aware that the reward 306 is at risk, prior to performing the discouraged conduct.

Many of the examples described herein frame the monitored conduct of the user 102 as a positive action. For example, the fitness level of the user 102 may be evaluated based on how many times the user 102 visited their gym in a given period of time (e.g., based on geolocation data). It should be understood, however, that certain types of monitored conduct may be framed as discouraged conduct and, as such, conduct trigger conditions 304 may be configured toward an absence of discouraged conduct. For example, an absence of purchasing cigarettes during a given period of time may be a successful conduct trigger condition 304 for a particular component of tracked conduct 302. It should be understood that many conduct trigger conditions 304 may be framed as either occurrences of positive action or as absence of discouraged action, any of which may be rewarded.

During operation, the conduct monitoring engine 120 identifies a monitoring profile for the user 102, such as the personal monitoring profile 310, and identifies each of the components of tracked conduct 302. For each component of tracked conduct 302, the conduct monitoring engine 120 evaluates each of the conduct trigger conditions 304. Evaluation of any given conduct trigger condition 304 may cause the conduct monitoring engine 120 to request, receive, or otherwise identify conduct data from one or more conduct data sources 330 (e.g., the user computing device 104, the sensors 110, the third party systems 130, or otherwise). Upon satisfaction of the conduct trigger conditions 304, the conduct monitoring engine 120 generates a reward event 320 to provide the reward 306 to the user 102.

Figure 4:
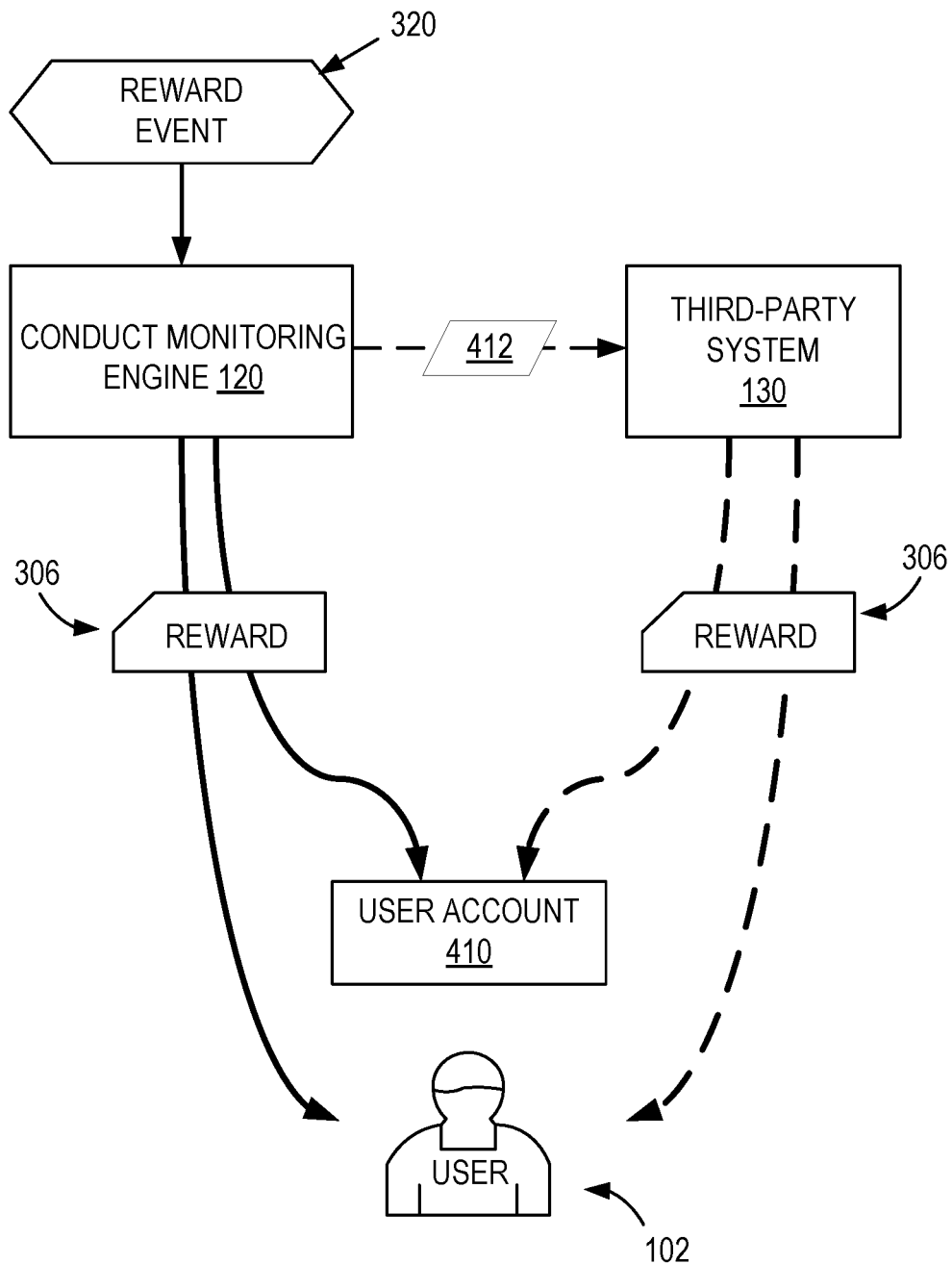
FIG. 4 is a workflow diagram illustrating the conduct monitoring engine processing the reward event to provide the reward to the user.

FIG. 4 is a workflow diagram illustrating the conduct monitoring engine 120 processing the reward event 320 to provide the reward 306 to the user 102. In some embodiments, the reward event 320 causes the conduct monitoring engine 120 to provide the reward 306 to the user 102. In other words, for those rewards 306 that may be provided directly to the user 102 by the conduct monitoring engine 120 (e.g., without need for a third party), the conduct monitoring engine 120 delivers the reward 306 to the user 102. FIG. 4 illustrates the "direct" reward processing in thick solid line. Some rewards 306 may be provided directly to the user, such as via an email, or postal mail, or by deposit into a user account 410 of the user 102 (e.g., a retirement account, a rewards account).

In other embodiments, the conduct monitoring engine 120 may engage a third party to provide the reward 306 to the user 102. FIG. 4 illustrates the "indirect" reward processing in broken line. For example, presume the reward 306 for the component of tracked conduct 302A is a discount to an exercise gym funded or otherwise sponsored by a health insurance provider of the user 102. As such, upon occurrence of the reward event 320, the conduct monitoring engine 120 may transmit a reward message 412 to the health insurance provider (e.g., as a third-party system 130) indicating that the user 102 has satisfied the component of tracked conduct 302A (e.g., that the user 102 is entitled to the reward 306). The reward message 412 may include, for example, user information identifying the user 102 (e.g., a shared user identifier (ID)), a reward ID identifying the reward or reward offer, a digital certificate authenticating the conduct monitoring engine 120 to the third-party system 130, or conduct data associated with the component of tracked conduct 302A. The health insurance provider may then, for example, send an email to the user 102 with a discount coupon for their gym. As such, the conduct monitoring engine 120 may engage third-party systems 130 to provide the reward 306. In some embodiments, the third-party system 130 may provide the reward 306 into the user account 410. In some embodiments, processing the reward event 320 may engage more than one third-party system 130 (e.g., the reward message 412 may cascade from the health insurance provider to the gym, and the gym may provide the reward 306 directly to the user 102).

Figure 5:
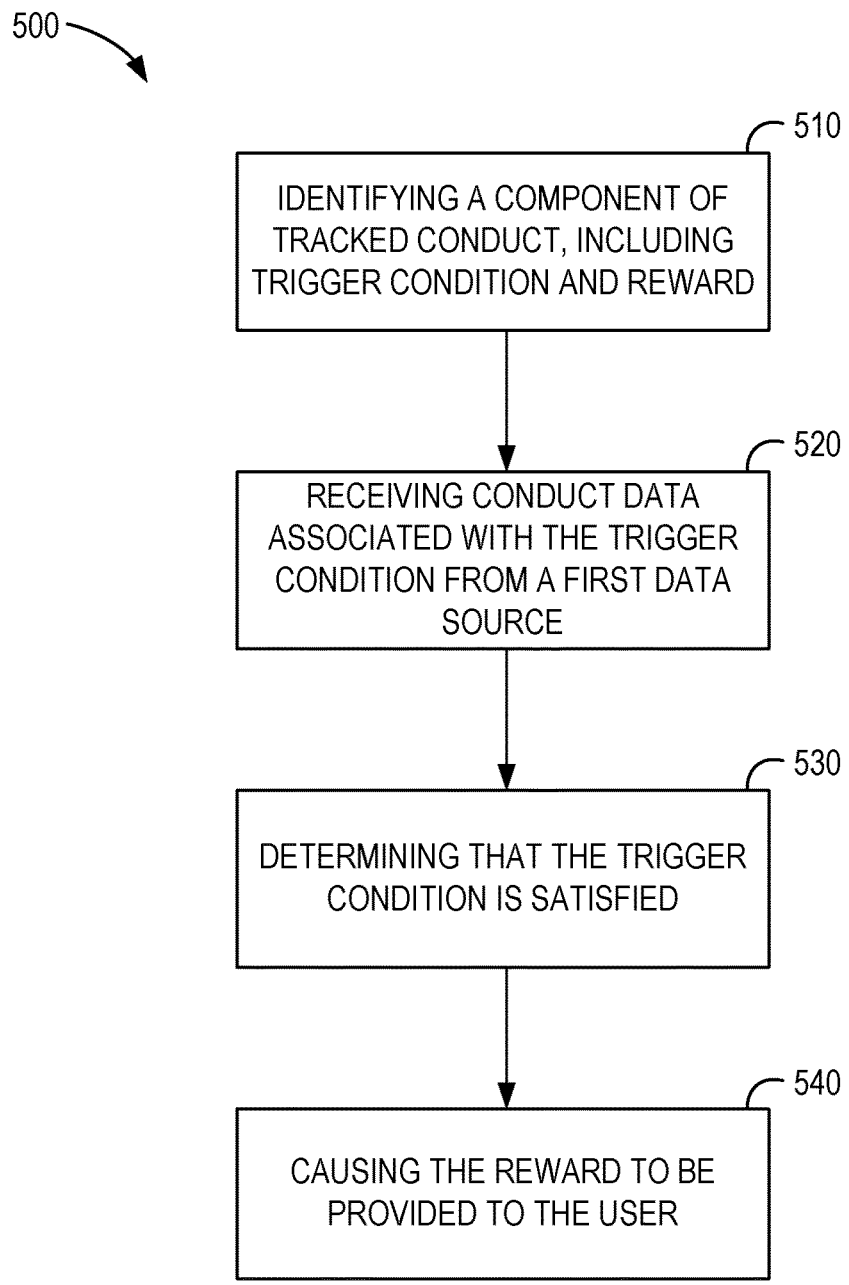
FIG. 5 illustrates an example computer-implemented method for incentivizing the user regarding retirement.

FIG. 5 illustrates an example computer-implemented method 500 for incentivizing the user 102 regarding retirement. The computer-implemented method 500, hereafter referred to as "the method 500," is performed by a computing device comprising at least one hardware processor and a memory. In an example embodiment, the method 500 includes identifying a component of tracked conduct, the component of tracked conduct including a first conduct trigger condition and a reward, the first conduct trigger condition is associated with conduct of a user related to retirement (see operation 510). The method also includes receiving conduct data associated with the first conduct trigger condition from a first data source (see operation 520). The method further includes determining, using the conduct data, that the first conduct trigger condition is satisfied (see operation 530). The method also includes causing the reward to be provided to the user (see operation 540). In some embodiments, the reward is associated with retirement.

In some embodiments, the first trigger condition is associated with the health of the user, and receiving conduct data includes receiving biometric sensor data from a biometric sensor associated with the user, and the first data source includes the biometric sensor. In some embodiments, the first trigger condition is associated with spending by the user, and receiving conduct data includes receiving transaction data associated with the user from the first data source, the transaction data identifying at least one spending event performed by the user. In some embodiments, the first trigger condition is associated with retirement planning by the user, and receiving conduct data includes receiving retirement planning data associated with the user from the first data source. In some embodiments, the first trigger condition is associated with an increase in a deposit rate into the retirement account, and the conduct data is associated with the deposit rate, and determining that the first conduct trigger is satisfied includes determining that the deposit rate has increased. In some embodiments, causing the reward to be provided to the user includes transmitting a reward message to a third-party system indicating that the user is entitled to the reward.

Figure 6:
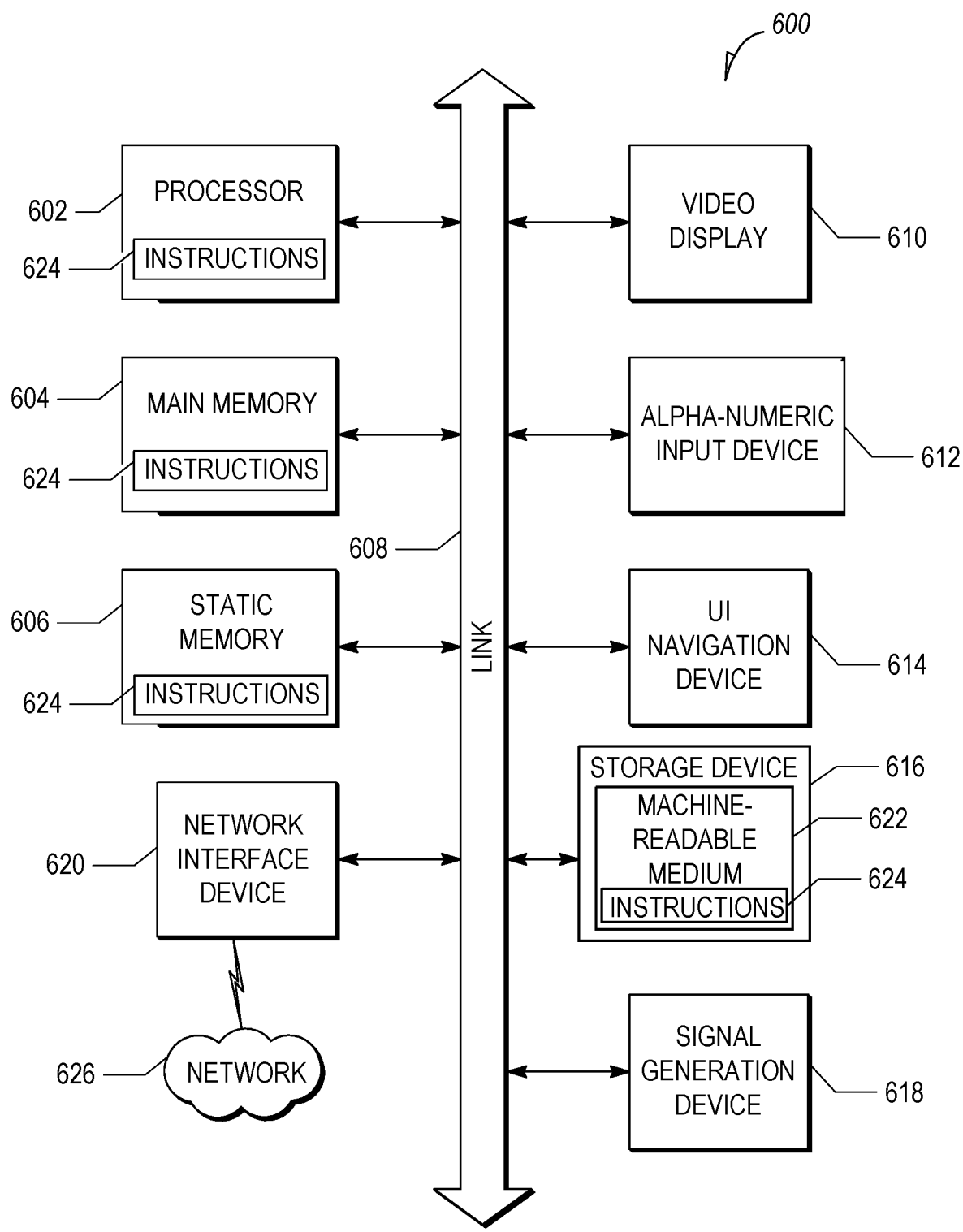
FIG. 6 is a block diagram illustrating a machine in the example form of a computer system, within which a set or sequence of instructions can be executed to cause the machine to perform any one of the methodologies discussed herein, according to an example embodiment.

FIG. 6 is a block diagram illustrating a machine in the example form of a computer system 600, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 can further include a video display unit 610, an alphanumeric input device 612 (e.g., a keyboard), and a user interface (UI) navigation device 614 (e.g., a mouse). In one embodiment, the video display unit 610, alphanumeric input device 612, and UI navigation device 614 are incorporated into a touch-screen display. The computer system 600 can additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, within the static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding, or carrying instructions (e.g., instructions 624) for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments can feature a subset of said features. Further, embodiments can include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

What is claimed is:

1. A system comprising:
   at least one hardware processor; and
   a memory storing instructions that, when executed by the at least one hardware processor, cause the at least one hardware processor to perform operations comprising:

presenting a user interface, the user interface configured to define components of tracked conduct of a user in a monitoring profile of the user;
accessing the monitoring profile of a user, the monitoring profile identifying the components of the tracked conduct of the user, the components including:
a conduct trigger condition related to retirement of the user represented as a logical definition;
a reward; and
a conduct data source;
receiving conduct data associated with the conduct trigger condition from the conduct data source, the conduct data being selected from one of: biometric sensor data from a biometric sensor associated with the user; transaction data associated with the user: retirement planning data associated with the user; or global positioning system (GPS) data associated with the user;
evaluating the conduct data;
determining, using the conduct data, that the conduct trigger condition is satisfied by comparing the conduct data with the monitoring profile of the user; and
based on comparing the conduct data with the monitoring profile of the user, providing the reward to the user or causing the user to alter tracked conduct, wherein providing the reward to the user includes:
identifying an association between the user and a third party; and
establishing a communication link between the third party and the user in order to provide the reward to the user.

2. The system of claim 1, wherein the reward is associated with retirement.

3. The system of claim 1, wherein the conduct trigger condition is associated with the health of the user and receiving conduct data includes receiving the biometric sensor data from the biometric sensor associated with the user, wherein the conduct data source includes the biometric sensor.

4. The system of claim 1, wherein the conduct trigger condition is associated with spending by the user and receiving conduct data includes receiving the transaction data associated with the user from the conduct data source, the transaction data identifying at least one spending event performed by the user.

5. The system of claim 1, wherein the conduct trigger condition is associated with retirement planning by the user and receiving conduct data includes receiving the retirement planning data associated with the user from the conduct data source.

6. The system of claim 1, wherein the conduct trigger condition is associated with an increase in a deposit rate into the retirement account, wherein the conduct data is associated with the deposit rate, wherein determining that the conduct trigger condition is satisfied includes determining that the deposit rate has increased.

7. The system of claim 1, wherein causing the reward to be provided to the user includes transmitting a reward message to a third-party system indicating that the user is entitled to the reward.

8. A computer-implemented method comprising:
presenting a user interface, the user interface configured to define components of tracked conduct of a user in a monitoring profile of the user;
accessing with a processor, the monitoring profile of a user, the monitoring profile identifying the components of the tracked conduct of the user, the components including:
a conduct trigger condition related to retirement of the user represented as a logical definition;
a reward; and
a conduct data source;
receiving conduct data associated with the conduct trigger condition from the conduct data source, the conduct data being selected from one of: biometric sensor data from a biometric sensor associated with the user; transaction data associated with the user: retirement planning data associated with the user; or global positioning system (GPS) data associated with the user;
evaluating the conduct data;
determining, using the conduct data, that the conduct trigger condition is satisfied by comparing the conduct data with the monitoring profile of the user; and
based on comparing the conduct data with the monitoring profile of the user, providing the reward to the user or causing the user to alter tracked conduct, wherein providing the reward to the user includes:
identifying an association between the user and a third party; and
establishing a communication link between the third party and the user in order to provide the reward to the user.

9. The method of claim 8, wherein the reward is associated with retirement.

10. The method of claim 8, wherein the conduct trigger condition is associated with the health of the user and receiving conduct data includes receiving the biometric sensor data from the biometric sensor associated with the user, wherein the conduct data source includes the biometric sensor.

11. The method of claim 8, wherein the conduct trigger condition is associated with spending by the user and receiving conduct data includes receiving the transaction data associated with the user from the conduct data source, the transaction data identifying at least one spending event performed by the user.

12. The method of claim 8, wherein the conduct trigger condition is associated with retirement planning by the user, wherein receiving conduct data includes receiving retirement planning data associated with the user from the conduct data source.

13. The method of claim 8, wherein the conduct trigger condition is associated with an increase in a deposit rate into the retirement account, wherein the conduct data is associated with the deposit rate, wherein determining that the conduct trigger condition is satisfied includes determining that the deposit rate has increased.

14. The method of claim 8, wherein causing the reward to be provided to the user includes transmitting a reward message to a third-party system indicating that the user is entitled to the reward.

15. A non-transitory computer-readable storage medium, the computer-readable storage medium including instructions that, when executed by a computer, cause the computer to perform operations comprising:
presenting a user interface, the user interface configured to define components of tracked conduct of a user in a monitoring profile of the user;
accessing the monitoring profile of a user, the monitoring profile identifying the components of the tracked conduct of the user, the components including:
a conduct trigger condition related to retirement of the user represented as a logical definition;
a reward; and
a conduct data source;

receiving conduct data associated with the conduct trigger condition from the conduct data source, the conduct data being selected from one of: biometric sensor data from a biometric sensor associated with the user; transaction data associated with the user: retirement planning data associated with the user; or global positioning system (GPS) data associated with the user;

evaluating the conduct data;

determining, using the conduct data, that the conduct trigger condition is satisfied by comparing the conduct data with the monitoring profile of the user; and based on comparing the conduct data with the monitoring profile of the user, providing the reward to the user or causing the user to alter tracked conduct, wherein providing the reward to the user includes:

identifying an association between the user and a third party; and establishing a communication link between the third party and the user in order to provide the reward to the user.

16. The non-transitory computer-readable storage medium of claim 15, wherein the reward is associated with retirement.

17. The non-transitory computer-readable storage medium of claim 15, wherein the conduct trigger condition is associated with spending by the user and receiving conduct data includes receiving the transaction data associated with the user from the conduct data source, the transaction data identifying at least one spending event performed by the user.

18. The non-transitory computer-readable storage medium of claim 15, wherein the conduct trigger condition is associated with retirement planning by the user and receiving conduct data includes receiving retirement planning data associated with the user from the conduct data source.

19. The non-transitory computer-readable storage medium of claim 15, wherein the conduct trigger condition is associated with an increase in a deposit rate into the retirement account, wherein the conduct data is associated with the deposit rate, wherein determining that the conduct trigger condition is satisfied includes determining that the deposit rate has increased.

20. The non-transitory computer-readable storage medium of claim 15, wherein causing the reward to be provided to the user includes transmitting a reward message to a third-party system indicating that the user is entitled to the reward.

* * * * *